United States Patent [19]
Jimenez et al.

[11] Patent Number: 5,736,182
[45] Date of Patent: Apr. 7, 1998

[54] AROMA CONCENTRATION PROCESS

[75] Inventors: Joseph Victor Jimenez, Dublin; Richard Tien-Szu Liu, Worthington, both of Ohio

[73] Assignee: Nestec S.A., Vevey, Switzerland

[21] Appl. No.: 766,200

[22] Filed: Dec. 12, 1996

[51] Int. Cl.$^6$ ............... A23C 1/06; A23F 5/00; A23L 2/00; B01D 9/04
[52] U.S. Cl. .......... 426/384; 426/594; 426/595; 426/599; 426/597; 426/386; 426/387; 62/123
[58] Field of Search .................. 426/594, 384, 426/595, 599, 597, 386, 387; 62/123

[56] References Cited

U.S. PATENT DOCUMENTS

| | | | |
|---|---|---|---|
| 3,554,761 | 1/1971 | Carbonell | 99/71 |
| 3,989,852 | 11/1976 | Palmer | 426/289 |
| 3,997,685 | 12/1976 | Strobel | 426/594 |
| 4,277,509 | 7/1981 | Wouda | 426/387 |
| 4,830,645 | 5/1989 | Ghodsizadeh et al. | 62/541 |

FOREIGN PATENT DOCUMENTS

| | | |
|---|---|---|
| 823 142 | 9/1969 | Canada. |
| 837 021 | 3/1970 | Canada. |
| 1 041 363 | 10/1978 | Canada. |
| 0 008 015 | 10/1982 | European Pat. Off.. |
| 0 132 985 | of 0000 | Netherlands. |
| 1 541 895 | 3/1979 | United Kingdom. |

*Primary Examiner*—Marian C. Knode
*Assistant Examiner*—Ali R. Salimi
*Attorney, Agent, or Firm*—Pennie & Edmonds LLP

[57] ABSTRACT

A process for the production of a concentrated aroma solution from an aqueous solution containing water-soluble aroma components; for example coffee, tea or fruit aroma components. Soluble solids are added to the aqueous solution to provide a fortified solution. Then the fortified solution is chilled to provide ice and a concentrated aqueous liquid. The concentrated aqueous liquid has a concentration of soluble solids above about 9% by weight and contains water-soluble aroma components. At least a portion of the concentrated aqueous liquid is collected as the concentrated aroma solution. Little or no aroma components and soluble solids are lost in the ice and little or no deterioration of the aroma components occurs.

21 Claims, 1 Drawing Sheet

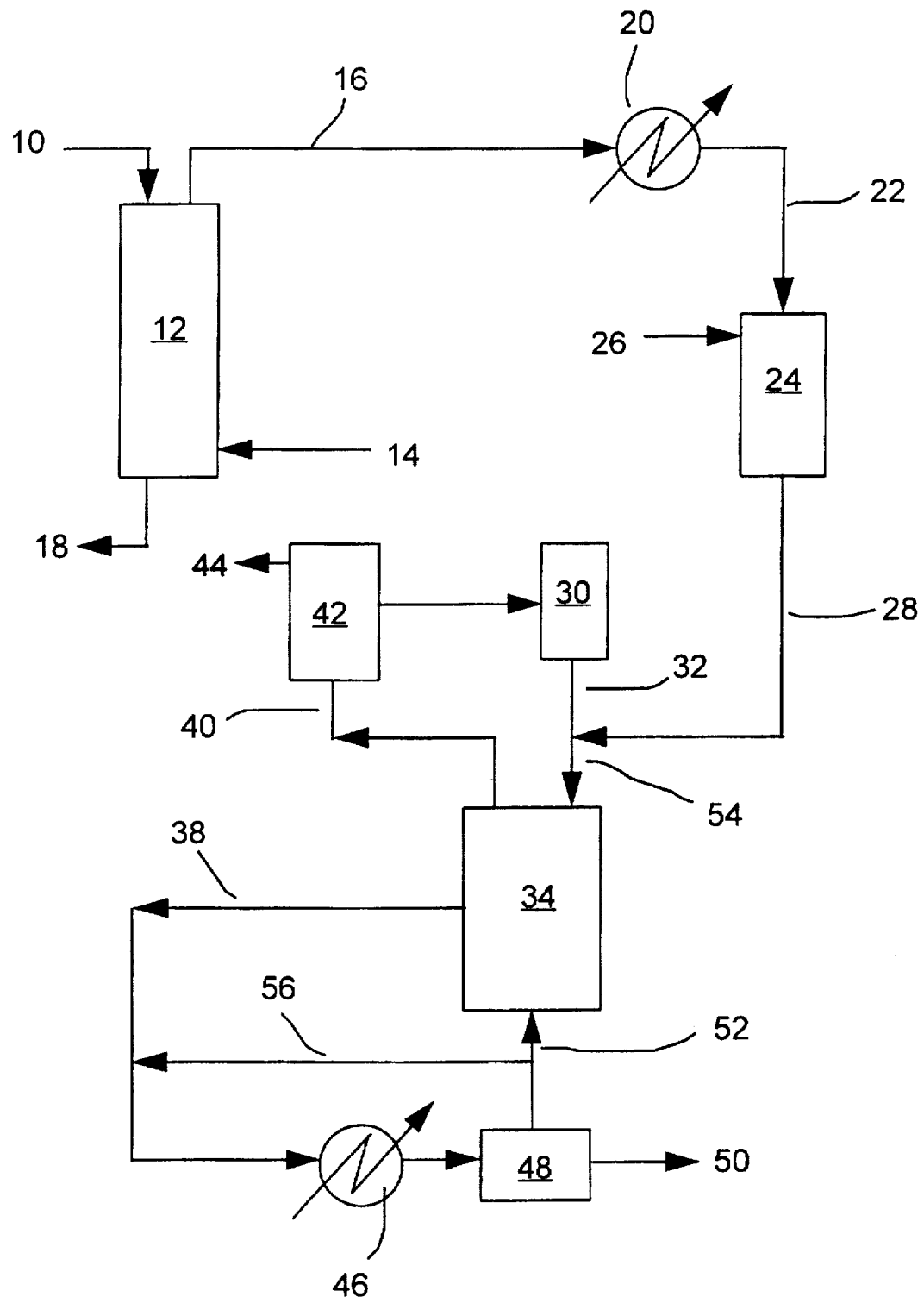

AROMA CONCENTRATION PROCESS

FIELD OF THE INVENTION

This invention relates to a process for concentrating aqueous aroma solutions using freeze concentration techniques. The process is particularly suitable for concentrating aqueous distillates which contain low levels of coffee aroma.

BACKGROUND TO THE INVENTION

It is often desirable to concentrate dilute, aqueous solutions which contain natural aromas. This is particularly the case in the coffee industry. Soluble coffee powders which are obtained from commercial processes involving extraction, concentration and drying, are usually substantially aromaless. However, it is important for soluble coffee products to have aroma since consumers associate coffee aroma with quality coffee products. If a soluble coffee product lacks coffee aroma, consumer perception of the product is adversely affected. For this reason, it is conventional to recover coffee aromas which are given off during the processing of the soluble coffee powders and to later reincorporate these aromas into the soluble coffee powder.

The coffee aroma components may be recovered at several points during processing of the soluble coffee powder. One commonly applied procedure is to recover coffee aroma components by steam stripping of coffee extract leaving an extraction system. The mixture of steam and coffee aroma components is then condensed to form an aqueous distillate. The aqueous distillate is primarily comprised of water of coffee aroma components and soluble coffee solids.

The coffee extract from which aroma components are stripped is then usually concentrated to a soluble coffee solids concentration of up to about 55% by weight; usually by evaporation. The aqueous distillate is then added back to the concentrated coffee extract. By removing the aroma components prior to concentration and then adding them back after concentration, loss of coffee aroma components during concentration is reduced. However, because of the low concentration of soluble coffee solids and coffee aroma components in the aqueous distillate, unwanted dilution of the concentrated coffee extract occurs. This dilution may result in a drop in the concentration of soluble coffee solids by as much as 5% to 10% by weight. This is undesirable since it requires further water to be removed in the subsequent drying step in which the concentrated coffee extract is converted to powder.

Attempts have been made to concentrate the aqueous distillate prior to combining the aqueous distillate with the concentrated coffee extract but these have not proved to be successful. Unfortunately, concentration of very dilute solutions by evaporation usually results in significant loss of aroma components; which defeats the purpose of separately processing the aroma components. Also, the use of thermal energy may cause the aroma components in the aqueous distillate to degrade. Consequently, the concentrated distillates which have been produced are often characterized by poor aroma.

Similar problems also arise in the concentration of dilute aqueous solutions containing other aromas; for example tea and fruit aroma.

Therefore it is an object of this invention to provide a process for concentrating aqueous solutions which contain low levels of water-soluble aroma components without significant loss and degradation of the aroma components.

SUMMARY OF THE INVENTION

Accordingly, this invention provides a process for the production of a concentrated aroma solution from an aqueous solution containing water soluble aroma components, the process comprising:

adding soluble solids to the aqueous solution containing the water-soluble aroma components to provide a fortified solution;

chilling the fortified solution to provide ice and a concentrated aqueous liquid having a concentration of soluble solids above about 9% by weight and containing water-soluble aroma components; and collecting at least a portion of the concentrated aqueous liquid as the concentrated aroma solution.

It is surprisingly found that the process enables the concentration of aqueous solutions containing water-soluble aroma components in a manner in which very little loss of the aroma components occurs. Further, it is found that the aqueous solution may be concentrated in a manner which results in little or no degradation of the aroma components. Moreover, it is found that little or no soluble solids are lost in the ice. These are significant advantages.

Preferably the fortified solution is chilled by introducing the fortified solution into a freeze concentration system in which:

a first liquid stream containing soluble solids and water-soluble aroma components is introduced into the top of a column containing a porous rising bed of agglomerated ice crystals and occluded concentrated aqueous liquid;

a second stream of concentrated aqueous liquid, water-soluble aroma components and ice crystals is introduced into the bottom of the column;

agglomerated ice crystals are removed from the top of the porous rising bed to control the porosity of the porous rising bed so that a portion of the first liquid stream flows downwardly through the porous rising bed counter-current to the porous rising bed to displace concentrated aqueous liquid and aroma components occluded on ice crystals in the porous rising bed; the remainder of the first liquid stream transporting the removed agglomerated ice crystals from the column in a third stream;

a fourth stream of a mixture of the first liquid stream flowing through the porous rising bed and the displaced concentrated aqueous liquid and aroma components is removed from the column;

the fourth stream is subjected to freezing to provide ice crystals and concentrated aqueous liquid and aroma components; and a portion of the concentrated aqueous liquid and aroma components is removed as the concentrated aroma solution.

Preferably the fortified solution is introduced into the system as part of the first liquid stream.

The soluble solids are preferably added to the aqueous solution containing the water-soluble aroma components in the form of a concentrated extract.

Preferably, the concentration of the soluble solids in the fortified solution is about 0.3 to about 10% by weight. In one embodiment, the concentration of the soluble solids in the fortified solution may be about 2% to about 10% by weight; more preferably about 3% to about 6% by weight. In another embodiment, the concentration of the soluble solids in the fortified solution may be about 0.3% to about 1.5% by weight; the concentration of the soluble solids in the third stream being about 1% to about 10% by weight and the concentration of the soluble solids in the second stream being about 9% to about 35% by weight.

Preferably the concentration of the soluble solids in the concentrated aqueous liquid is at least about 15% by weight.

The water-soluble aroma components are preferably selected from water-soluble coffee, tea and fruit aroma components.

The invention also provides a concentrated aroma solution produced by the process defined above.

BRIEF DESCRIPTION OF THE DRAWINGS

Embodiments of the invention are now described, by way of example only, with reference to the drawing which is a schematic illustration of a concentration process.

DETAILED DESCRIPTION OF THE INVENTION

The process involves the freeze concentration of an aqueous solution containing water-soluble aroma components; for example water-soluble coffee, tea and fruit aroma components. The process is particularly suitable for concentrating aqueous distillates obtained by steam stripping a coffee extract and will be primarily described in relation to these aqueous distillates. It will be appreciated however that the process may be used to concentrate any aqueous solution which contains water-soluble aroma components; not only aqueous coffee distillates.

To produce an aqueous distillate, a coffee extract 10 is introduced into the top of a stripping column 12. The coffee extract 10 may be produced in any suitable manner. Steam 14 is introduced into the bottom of the stripping column 12 and flows upward, counter-current to the falling coffee extract, to strip aqueous aroma components from the falling coffee extract. The stripped extract 18 leaves the bottom of the stripping column 12 and is then further processed as is conventional. The gaseous mixture 16 of the steam and aqueous aroma components leaves the top of the stripping column 12 and is transferred to one or more condensers 20. The gaseous mixture 16 is condensed in the condensers 20 and is collected as an aqueous distillate 22 comprising water, water-soluble aroma components and minor amounts of soluble coffee solids.

The aqueous distillate 22 is transferred to a mixer 24 into which soluble coffee solids 26 are added. The mixer 22 may be a suitable in-line mixer, such as a static mixer, or may be in the form of a separate, agitated tank. The soluble coffee solids 26 may be in the form of a coffee powder or a concentrated coffee extract. The amount of the soluble coffee solids 26 added is preferably sufficient to raise the concentration of soluble coffee solids in the aqueous distillate to about 0.3% to about 10% by weight.

The fortified distillate 28 leaving the mixer 24 is combined with a feed liquor 32. The feed liquor 32 contains about 0.1% to about 10% by weight soluble coffee solids. The feed mixture 54 which results from the combination is fed into the top of a gradient column 34. The gradient column 34 may be as described in U.S. Pat. No. 4,830,645, the disclosure of which is incorporated by reference. The gradient column 34 is filled with a rising, porous bed of ice. The upper level of the bed of ice is maintained constant by a cutter (not shown) which continually removes ice crystals from the bed.

A portion of the feed mixture 54 permeates downwardly through the ice bed. Since the feed liquor is relatively dilute, it displaces more concentrated coffee liquor and aroma components which are trapped or occluded in the porous bed. The remaining portion of the feed liquor 54 entrains ice crystals cut from the rising bed and leaves the top of the gradient column 34 as a dilute discharge 40. The dilute discharge 40 flows into a wash column 42 in which the ice crystals are separated from the liquid in the dilute discharge 40. The ice crystals 44 are collected from the wash column 42 while the liquid is transferred to a surge tank 30 from which it leaves as the feed liquor 32. If desired, the surge tank 30 may be omitted. The flow from the top of the gradient column 34 to the wash column 42, the surge tank 30 and back to the gradient column 34 is referred to as the "top recycle loop".

The portion of the feed mixture 54 which permeates through the rising bed leaves the gradient column 34 as a concentrated discharge 38. The concentration of the coffee solids and water-soluble aroma components in the concentrated discharge 38 is much higher than that in the feed mixture 54. The concentrated discharge 38 is preferably combined with a concentrated recycle stream 56, which is a ice slurry, and transferred to a crystallizer 46. The crystallizer 46 is a suitable heat exchanger, for example a scraped surface heat exchanger, in which the mixture of the concentrated discharge 38 and concentrated recycle stream 56 is cooled to freeze a portion of the water in the mixture. For example, the mixture may be cooled sufficiently to increase the ice concentration in the mixture by about 20% to about 40% by weight. Suitable temperatures to which the mixture may be cooled are about $-1°$ C. to about $-5°$ C.

The cooled mixture is transferred to a filter 48 in which a portion of the liquid in the cooled mixture is separated off as a concentrated distillate 50. The remaining portion of the cooled mixture is separated into the concentrated recycle stream 56 and a concentrated feed 52 which is fed into the bottom of the gradient column 52. The flow from the gradient column 34 to the crystallizer 46, the filter 48 and back to the gradient column 34 is referred to as the "product loop".

The concentrated distillate 50 has an elevated soluble coffee solids concentration; for example about 9% to about 35% by weight. Further, the concentrated distillate 50 contains substantially all of the aroma components in the aqueous distillate 22. Very little or no aroma components are present in the ice crystals leaving the wash column 42. The concentrated distillate 50 is therefore an ideal means of aromatizing concentrated coffee extracts since it is concentrated and contains substantially all aroma components originally collected in the aqueous distillate 22.

It will be appreciated that the fortified distillate 28 may be subjected to other freeze concentration processes since the particular freeze concentration process selected is not critical. Examples the other suitable processes are described in U.S. Pat. No. 4,830,645. Also, further details on the operation of the gradient column 34, crystallizer 46, filter 48, wash column 42 and surge tank 30 may be obtained from U.S. Pat. No. 4,830,645.

Once the concentrations of soluble coffee solids in the top recycle loop and product loop have reached acceptably high levels, the concentration of the soluble coffee solids in the fortified distillate 28 may be lowered. For example, the concentration of soluble coffee solids in the top recycle loop should be in the range of about 2% to about 10% by weight and the concentration of soluble coffee solids in the product loop should be in the range of about 95% to about 35% by weight. Under these conditions, the concentration of the soluble coffee solids in the fortified distillate 28 may be lowered to in the range of about 0.3% to about 1.5% by weight. Therefore the fortified distillate may undergo up to about a 30 to 50 fold concentration when compared to the concentrated distillate.

Instead of using the concentrated distillate 50 as a means of aromatizing concentrated coffee extracts, the concentrated distillate 50 may be subjected to suitable procedures to encapsulate the coffee aroma components. Suitable procedures are known; for example those described in U.S. Pat. No. 3,989,852, European patent application 0008015, and Canadian Patent 837021.

It will be appreciated that numerous modifications may be made to the embodiment described above without departing from the scope of the invention. For example, it is not necessary to introduce the fortified distillate 28 into the top of the gradient column 34 as a part of the feed liquor 32. Instead, for example, the fortified distillate 28 may be introduced into either of the top recycle loop or the product recycle loop.

It will also be appreciated that other water-soluble aroma components may be concentrated in the same way. In these cases, the soluble solids used should be compatible with the water-soluble aroma components. For example, for the concentration of water-soluble tea aroma components, the soluble solids are preferably soluble tea solids. Similarly, for the concentration of water-soluble fruit aroma components, the soluble solids are preferably soluble solids of the same type of fruit.

EXAMPLE 1

A freeze concentration system as described in U.S. Pat. No. 4,830,645 which comprises a gradient column, a crystallizer, a filter, a wash column and a surge tank is used. Aqueous coffee distillate is obtained from a condenser system and is transferred to a mixer. A concentrated coffee liquor, which has a soluble coffee solids concentration of about 56% by weight, is added to the aqueous distillate under mixing in a mass ratio of about 1:11.4. The fortified distillate which results has a soluble coffee solids concentration of about 4.5% by weight. The fortified distillate is then combined with a feed liquor leaving the surge tank which has a soluble coffee solids concentration of about 3.7% by weight and the mixture fed into the gradient column. The flow rate of the fortified distillate is about 1.8 kg/min and the flow rate of the feed liquor is about 20.9 kg/min.

A concentrated discharge is removed from the gradient column at a flow rate of 9.1 kg/min. The concentrated discharge has a soluble coffee solids concentration of about 18% by weight. The concentrated discharge is combined with a concentrated recycle stream at a flow rate of 29 kg/min and a soluble coffee solids concentration of about 22.5% by weight and the mixture fed into a crystallizer operating at about −2° C. In the crystallizer, a proportion of the water is frozen hence raising the soluble coffee solids concentration in the remaining water to about 22.5% by weight.

The mixture leaving crystallizer is transferred to a filter in which about 0.4 kg/min of liquid is drawn off as the concentrated distillate. The concentrated distillate has a soluble coffee concentration of about 22.5% by weight. The remainder of the mixture introduced into the filter is split into the concentrated recycle stream and a concentrated feed which is fed into the bottom of the gradient column.

A dilute discharge is removed from the top of the gradient column at a flow rate of about 22.3 kg/min. The dilute discharge has a soluble coffee concentration of about 3.8% by weight. The dilute discharge is transferred to a wash column in which the ice in the dilute discharge is separated from the liquid. The ice is removed from the wash column at a flow rate of about 1.4 kg/min. The liquid is transferred to the surge tank.

The two outputs from the freeze concentration system, the ice from the wash column and the concentrated distillate, are then separately subjected to gas chromatograph analysis. The fortified distillate originally fed to the freeze concentration system is subjected to gas chromatograph analysis. The chromatograph for the ice indicates that the ice contains no detectable amounts of coffee aroma components. A comparison of the chromatographs for the fortified distillate and concentrated distillate reveals that the concentrated distillate contains above 94% of all coffee aroma components contained in the fortified distillate. The ice is also visually inspected. It is completely clear with no detectable traces of soluble coffee solids.

The concentrated distillate is, therefore, a 5 fold concentrate of the fortified distillate, when measured in terms of soluble coffee solids concentration, but contains substantially all the coffee aroma components originally found in the fortified distillate.

EXAMPLE 2

The concentrated distillate of example 1 is combined with a concentrated coffee extract and spray dried to powder in the conventional manner. The powder is labeled sample 1. For comparison, an aqueous distillate obtained directly from the condensers is combined with concentrated coffee extract and spray dried to powder in the conventional manner. The powder is labeled sample A.

Samples 1 and A are each dissolved in hot water and subjected to a triangle taste test using a trained panel. No significant differences in flavor and quality are determined. This indicates that the coffee aroma components in the concentrated distillate have not degraded.

EXAMPLE 3

The procedure of example 1 is repeated except that the amount of the concentrated coffee liquor added to the aqueous distillate is reduced so that the fortified distillate has a soluble coffee solids concentration of about 0.86% by weight. The concentrated distillate is removed from the filter with a soluble coffee solids concentration of about 22.5% by weight.

The ice from the wash column, the concentrated distillate and the fortified distillate are then separately subjected to gas chromatograph analysis. The chromatograph for the ice indicates that the ice contains at most minor traces of coffee aroma components (less than 0.15% of coffee aroma components detected in the concentrated distillate). A comparison of the chromatographs for the fortified distillate and concentrated distillate reveals that the concentrated distillate contains most of the coffee aroma components contained in the fortified distillate. The ice is also visually inspected. It is completely clear with no detectable traces of soluble coffee solids.

The concentrated distillate is therefore is 26 fold concentrate of the fortified distillate, when measured in terms of soluble coffee solids concentration, but contains substantially all the coffee aroma components originally found in the fortified distillate.

EXAMPLE 4

The procedure of example 1 is repeated except that an aqueous distillate obtained by steam stripping a tea extract is used. Also, the soluble solids added to the aqueous distillate are soluble tea solids.

The ice from the wash column is visually inspected and is found to be clear with no detectable traces of soluble tea solids. Further, little trace of tea aroma components are found in the ice. The concentrated distillate is combined with a concentrated tea extract and spray dried to powder in the conventional manner. The powder is labeled sample 2. For comparison, an aqueous distillate obtained directly from the condensers is combined with concentrated tea extract and spray dried to powder in the conventional manner. The powder is labeled sample B.

Samples 2 and B are each dissolved in hot water and subjected to a triangle taste test using a trained panel. No significant differences in flavor and quality are determined. This indicates that the tea aroma components in the concentrated distillate have not degraded.

We claim:

1. A process for the production of a concentrated aroma solution from an aqueous solution containing water-soluble aroma components, the process comprising:

adding soluble solids to the aqueous solution containing the water-soluble aroma components to provide a fortified solution;

chilling the fortified solution to provide ice and a concentrated aqueous liquid having a concentration of soluble solids above 9% by weight and containing water-soluble aroma components; and collecting a portion of the concentrated aqueous liquid as the concentrated aroma solution by separation of the ice from the liquid.

2. The process according to claim 1 wherein soluble solids are added to the aqueous solution to provide a concentration of soluble solids of about 0.3 to about 10% by weight.

3. The process according to claim 2 wherein the soluble solids are added to the aqueous solution in the form of a concentrated extract.

4. The process according to claim 1 wherein the concentrated aqueous liquid has a concentration of soluble solids above 15% by weight.

5. The process according to claim 1 wherein the fortified solution is chilled by introducing the fortified solution into a freeze concentration system in which:

a first liquid stream containing soluble solids and water-soluble aroma components is introduced into the top of a column containing a porous rising bed of agglomerated ice crystals and occluded concentrated aqueous liquid;

a second stream of concentrated aqueous liquid, concentrated water-soluble aroma components and ice crystals is introduced into the bottom of the column;

agglomerated ice crystals are removed from the top of the porous rising bed to control the porosity of the porous rising bed so that a portion of the first liquid stream flows downwardly through the porous rising bed counter-current to the porous rising bed to displace concentrated aqueous liquid and water-soluble aroma components occluded on ice crystals in the porous rising bed; the remainder of the first liquid stream transporting the removed agglomerated ice crystals from the column in a third stream;

a fourth stream, of a mixture of the first liquid stream flowing through the porous rising bed and the displaced concentrated aqueous liquid and aroma components, is removed from the column;

the fourth stream is subjected to freezing to provide ice crystals and concentrated aqueous liquid and water-soluble aroma components; and a portion of the concentrated aqueous liquid and water-soluble aroma components is removed as the concentrated aroma solution.

6. The process according to claim 5 wherein the fortified solution is introduced into the freeze concentration system as part of the first liquid stream.

7. The process according to claim 6 wherein the soluble solids are added to the aqueous solution to provide a concentration of soluble solids of about 0.3% to about 1.5% by weight; the concentration of the soluble solids in the third stream being about 1% to about 10% by weight and the concentration of the soluble solids in the second stream being about 9% to about 35% by weight.

8. The process according to claim 1 wherein the water-soluble aroma components are selected from water-soluble coffee, tea and fruit aroma components.

9. A process for the production of a concentrated aroma solution from an aqueous solution containing water-soluble coffee aroma components, the process comprising:

adding soluble coffee solids to the aqueous solution containing the water-soluble aroma components to provide a fortified solution;

chilling the fortified solution to provide ice and a concentrated aqueous liquid having a concentration of soluble solids above 9% by weight and containing water-soluble aroma components; and collecting a portion of the concentrated aqueous liquid as the concentrated aroma solution by separation of the ice from the liquid.

10. The process according to claim 9 wherein the soluble coffee solids are added to the aqueous solution to provide a concentration of soluble coffee solids of about 0.3 to about 10% by weight.

11. The process according to claim 10 wherein the soluble coffee solids are added to the aqueous solution in the form of a concentrated coffee extract.

12. The process according to claim 9 wherein the concentrated aqueous liquid has a concentration of soluble solids above about 15% by weight.

13. The process according to claim 9 wherein the fortified solution is chilled by introducing the fortified solution into a freeze concentration system in which:

a first liquid stream containing soluble coffee solids and water-soluble coffee aroma components is introduced into the top of a column containing a porous rising bed of agglomerated ice crystals and occluded concentrated aqueous liquid;

a second stream of concentrated aqueous liquid, concentrated water-soluble aroma components and ice crystals is introduced into the bottom of the column;

agglomerated ice crystals are removed from the top of the porous rising bed to control the porosity of the porous rising bed so that a portion of the first liquid stream flows downwardly through the porous rising bed counter-current to the porous rising bed to displace concentrated aqueous liquid and water-soluble aroma components occluded on ice crystals in the porous rising bed; the remainder of the first liquid stream transporting the removed agglomerated ice crystals from the column in a third stream;

a fourth stream, of a mixture of the first liquid stream flowing through the porous rising bed and the displaced concentrated aqueous liquid and aroma components, is removed from the column;

the fourth stream is subjected to freezing to provide ice crystals and concentrated aqueous liquid and water-soluble aroma components; and a portion of the concentrated aqueous liquid and water-soluble aroma components is removed as the concentrated aroma solution.

14. The process according to claim 13 wherein the fortified solution is introduced into the freeze concentration system as part of the first liquid stream.

15. The process according to claim 14 wherein the soluble coffee solids are added to the aqueous solution to provide a concentration of soluble coffee solids of about 0.3% to about 1.5% by weight; the concentration of the soluble coffee solids in the third stream being about 1% to about 10% by weight and the concentration of the soluble coffee solids in the second stream being about 9% to about 35% by weight.

16. A process for the production of a concentrated aroma solution from an aqueous solution containing water-soluble coffee aroma components, the process comprising:

adding soluble coffee solids to the aqueous solution containing the water-soluble aroma components to provide a fortified solution having a concentration of coffee solids of about 0.3 to about 10% by weight;

chilling the fortified solution to provide ice and a concentrated aqueous liquid having a concentration of soluble solids above 15% by weight and containing water-soluble aroma components; and collecting a portion of the concentrated aqueous liquid as the concentrated aroma solution by separation of the ice from the liquid.

17. The process according to claim 16 wherein the fortified solution is chilled by introducing the fortified solution into a freeze concentration system in which:

a first liquid stream containing soluble coffee solids and water-soluble coffee aroma components is introduced into the top of a column containing a porous rising bed of agglomerated ice crystals and occluded concentrated aqueous liquid;

a second stream of concentrated aqueous liquid, concentrated water-soluble aroma components and ice crystals is introduced into the bottom of the column;

agglomerated ice crystals are removed from the top of the porous rising bed to control the porosity of the porous rising bed so that a portion of the first liquid stream flows downwardly through the porous rising bed counter-current to the porous rising bed to displace concentrated aqueous liquid and water-soluble aroma components occluded on ice crystals in the porous rising bed; the remainder of the first liquid stream transporting the removed agglomerated ice crystals from the column in a third stream;

a fourth stream, of a mixture of the first liquid stream flowing through the porous rising bed and the displaced concentrated aqueous liquid and aroma components, is removed from the column;

the fourth stream is subjected to freezing to provide ice crystals and concentrated aqueous liquid and water-soluble aroma components; and a portion of the concentrated aqueous liquid and water-soluble aroma components is removed as the concentrated aroma solution.

18. The process according to claim 17 wherein the fortified solution is introduced into the freeze concentration system as part of the first liquid stream.

19. The process according to claim 18 wherein soluble coffee solids are added to the aqueous solution to provide a concentration of soluble coffee solids of about 0.3% to about 1.5% by weight; the concentration of the soluble coffee solids in the third stream being about 1% to about 10% by weight and the concentration of the soluble coffee solids in the second stream being about 9% to about 35% by weight.

20. A process according to claim 1, wherein the concentrated solution is collected containing substantially all of the aroma components.

21. A process according to claim 1, wherein the concentrated solution is collected containing above 94% of the aroma components.

* * * * *